United States Patent [19]
Gottschalk et al.

[11] Patent Number: 5,650,466
[45] Date of Patent: Jul. 22, 1997

[54] THERMOPLASTIC POLYAMIDE MOLDING MATERIALS

[75] Inventors: Axel Gottschalk, Neustadt; Herbert Fisch, Wachenheim; Gunter Pipper, Bad Dürkheim; Martin Weber, Neustadt, all of Germany

[73] Assignee: BASF Aktiengesellschaft, Ludwigshafen, Germany

[21] Appl. No.: 583,189

[22] Filed: Jan. 4, 1996

[30] Foreign Application Priority Data

Jan. 19, 1995 [DE] Germany .................. 19501450

[51] Int. Cl.$^6$ .................. C08L 77/10; C08L 77/00; C08L 35/06; C08L 39/04
[52] U.S. Cl. .................. 525/66; 525/179; 525/182; 525/183; 524/514; 528/338
[58] Field of Search .................. 525/66, 182, 183, 525/179; 524/514; 528/338

[56] References Cited

U.S. PATENT DOCUMENTS 5,202,379  4/1993  Aoki ......................... 525/182

FOREIGN PATENT DOCUMENTS

| 0 049103 | 4/1982 | European Pat. Off. . |
| 0 345 486 | 12/1989 | European Pat. Off. . |
| 0 319055 | 12/1991 | European Pat. Off. . |
| 0 667 367 | 8/1995 | European Pat. Off. . |
| 022844 | 1/1987 | Japan ......................... 525/66 |

OTHER PUBLICATIONS

Chemical Abstracts, AN–87–146951/21, JP–62–084502, Apr. 18, 1987.
Chemical Abstracts, AN–55062 K/23, JP–58–071952, Apr. 28, 1983.

Primary Examiner—David Buttner
Attorney, Agent, or Firm—Oblon, Spivak, McClelland, Maier & Neustadt, P.C.

[57] ABSTRACT

Thermoplastic molding materials contain

A) from 5 to 95% by weight of a semicrystalline, partly aromatic copolyamide composed of $a_1$) from 30 to 44 mol % of units which are derived from terephthalic acid, $a_2$) from 6 to 20 mol % of units which are derived from isophthalic acid, $a_3$) from 43 to 49.5 mol % of units which are derived from hexamethylenediamine and $a_4$) from 0.5 to 7 mol % of units which are derived from aliphatic cyclic diamines of 6 to 30 carbon atoms, the molar percentages of the components $a_1$) to $a_4$) summing to 100%, B) from 5 to 95% by weight of a copolymer of vinylaromatic compounds with $\alpha,\beta$-unsaturated dicarboxylic anhydrides and $\alpha,\beta$-unsaturated dicarboximides, C) from 0 to 90% by weight of an SAN, ABS or ASA polymer or of a polymer of a $C_1$–$C_{18}$-alkyl ester of (meth)acrylic acid or of a mixture thereof, D) from 0 to 20% by weight of an elastomeric polymer, E) from 0 to 50% by weight of a fibrous or particulate filler and F) from 0 to 30% by weight of conventional additives and processing assistants, the percentages by weight of the components A) to F) summing to 100 %.

10 Claims, No Drawings

THERMOPLASTIC POLYAMIDE MOLDING MATERIALS

The present invention relates to thermoplastic molding materials containing
A) from 5 to 95% by weight of a semicrystalline, partly aromatic copolyamide composed of
  $a_1$) from 30 to 44 mol % of units which are derived from terephthalic acid,
  $a_2$) from 6 to 20 mol % of units which are derived from isophthalic acid,
  $a_3$) from 43 to 49.5 mol % of units which are derived from hexamethylenediamine and
  $a_4$) from 0.5 to 7 mol % of units which are derived from aliphatic cyclic diamines of 6 to 30 carbon atoms,
  the molar percentages of the components $a_1$) to $a_4$) summing to 100%,
B) from 5 to 95% by weight of a copolymer of vinylaromatic compounds with $\alpha,\beta$-unsaturated dicarboxylic anhydrides and $\alpha,\beta$-unsaturated dicarboximides,
C) from 0 to 90% by weight of an SAN, ABS or ASA polymer or of a polymer of a $C_1$–$C_{18}$-alkyl ester of (meth)acrylic acid or of a mixture thereof,
D) from 0 to 20% by weight of an elastomeric polymer,
E) from 0 to 50% by weight of a fibrous or particulate filler and
F) from 0 to 30% by weight of conventional additives and processing assistants,
the percentages by weight of the components A) to F) summing to 100%.

The present invention furthermore relates to the use of these molding materials for the production of moldings of any type and to the moldings obtainable therefrom.

Polymer blends serve in general for combining two different polymers, where the individual components each have the desired properties, the invention being as far as possible to compensate the undesirable properties. Other fields of use can thus be opened up with new blend compositions.

Polymer blends comprising polyamides with N-substituted maleimide copolymers are disclosed, for example, in EP-A 49103, EP-A 319 055, JP-A 62/084 502 and JP-A 58/071952. The known polymer blends have improved mechanical properties but high shrinkage during processing. Shrinkage is understood as meaning the difference in the areas or volumes of shaped articles after injection molding and after cooling of the shaped article. In the case of high shrinkage, the molding is considerably smaller after cooling (compared with the original injection mold) and, in the most unfavorable case, shrinkage is not uniform over the entire area.

It is an object of the present invention to provide thermoplastic molding materials which are based on polyamides and N-substituted maleimide copolymers and which also exhibit very little shrinkage during processing in addition to having good mechanical properties.

We have found that this object is achieved by the molding materials defined at the outset.

Preferred embodiments are described in the subclaims.

The novel molding materials contain, as component A), a partly aromatic semicrystalline copolyamide, in amounts of from 5 to 95, preferably from 20 to 80, in particular from 40 to 80, % by weight, composed of
  $a_1$) from 30 to 44, preferably from 32 to 40, in particular from 32 to 38, mol % of units which are derived from terephthalic acid,
  $a_2$) from 6 to 20, preferably from 10 to 18, in particular from 12 to 18, mol % of units which are derived from isophthalic acid,
  $a_3$) from 43 to 49.5, preferably from 46 to 48.5, in particular from 46.3 to 48.2, mol % of units which are derived from hexamethylenediamine, and
  $a_4$) from 0.5 to 7, preferably from 1.5 to 4, in particular from 1.8 to 3.7, mol % of units which are derived from aliphatic cyclic diamines of 6 to 30, preferably from 13 to 29, in particular from 13 to 17, carbon atoms,
the molar percentages of the components $a_1$) to $a_4$) summing to 100%.

The diamine units $a_3$) and $a_4$) are preferably reacted in aquimolar amounts with the dicarboxylic acid units $a_1$) and $a_2$).

Suitable monomers $a_4$) are preferably cyclic diamines of the formula

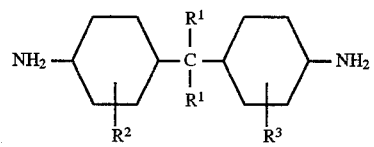

where
$R^1$ is hydrogen or $C_1$–$C_4$-alkyl, and
$R^2$ and $R_3$ are each $C_1$–$C_4$-alkyl or hydrogen.

Particularly preferred diamines $a_4$) are bis(4-aminocyclohexyl)-methane, bis(4-amino-3-methylcyclohexyl)methane, 2,2-bis(4-amino-cyclohexyl)propane and 2,2-bis(4-amino-3-methylcyclohexyl)-propane.

Further monomers $a_4$) are 1,3-and 1,4-cyclohexanediamine and isophoronediamine.

In addition to the units $a_1$) to $a_4$) described above, the partly aromatic copolyamides A) may contain up to 4, preferably up to 3.5, % by weight (based on 100% by weight of A)) of further polyamide-forming monomers $a_5$), as known from other polyamides.

Aromatic dicarboxylic acids $a_5$) are of 8 to 16 carbon atoms. Suitable aromatic dicarboxylic acids are, for example, substituted terephthalic and isophthalic acids, such as 3-tert-butyliso-phthalic acid, polynuclear dicarboxylic acids, eg. 4,4'-and 3,3'-biphenyldicarboxylic acid, 4,4'-and 3,3'-diphenylmethane-dicarboxylic acid, 4,4'- and 3,3'-dicarboxydiphenyl sulfone, 1,4- and 2,6-naphthalenedicarboxylic acid and phenoxyterephthalic acid.

Further polypaide-forming monomers $a_5$) may be derived from dicarboxylic acids of 4 to 16 carbon atoms and aliphatic diamines of 4 to 16 carbon atoms and from aminocarboxylic acids or corresponding lactams of 7 to 12 carbon atoms. Some suitable monomers of these types which may be mentioned here are suberic acid, azelaic acid or sebacic acid, as typical aliphatic dicarboxylic acids, 1,4-butanediamine, 1,5-pentanediamine or piperazine, as typical diamines, and caprolactam, capryllactam, enantholactam, ω-aminoundecanoic acid and laurolactam as typical lactams and aminocarboxylic acids.

Other partly aromatic copolyamides which have proven particularly advantageous are those whose triamine content is less than 0.5, preferably less than 0.3, % by weight.

Partly aromatic copolyamides prepared by most known processes (cf. U.S. Pat. No. 4,603,166) have triamine contents which are above 0.5% by weight, which leads to a deterioration in product quality and to problems in the continuous preparation. A particular triamine which gives rise to these problems is dihexamethylenetriamine, which is formed from the hexamethylenediamine used in the preparation.

Copolyamides having a low triamine content have lower melt viscosities than products of the same composition which have a higher triamine content, the solution viscosities being the same. This considerably improves both the processability and the product properties.

The melting points of the partly aromatic copolyamides are from 290° to 340° C., preferably from 292° to 330° C., this melting point being associated with a high glass transition temperature of, as a rule, more than 120° C., in particular more than 130° C. (in the dry state).

The partly aromatic copolyamides are to be understood, according to the invention, as meaning those which have a crystallinity of >30%, preferably >35%, in particular >40%.

The crystallinity is a measure of the proportion of crystalline fragments in the copolyamide and is determined by X-ray diffraction or indirectly by measuring $\Delta H_{cryst}$.

Blends of partly aromatic copolyamides can of course also be reacted, any desired mixing ratio being possible.

Suitable processes for the preparation of the novel copolyamides are known to a person skilled in the art.

The preferred preparation method is the batch process. Here, the aqueous monomer solution is heated in an autoclave to 280°–340° C. in the course of from 0.5 to 3 hours, a pressure of 10–50, in particular 15–40, bar being reached, which is kept very constant for up to 2 hours by releasing excess steam. The autoclave is then let down at constant temperature to a final pressure of from 1 to 5 bar in the course of 0.5–2 hours. The polymer melt is then discharged, cooled and granulated.

Another preferred process is carried out similarly to the processes described in EP-A 129 195 and 129 196.

In these processes, an aqueous solution of the monomers $a_1$) to $a_4$) and, if required, $a_5$), having a monomer content of from 30 to 70, preferably from 40 to 65, % by weight, is heated to 280°–330° C. in the course of less than 60 seconds under superatmospheric pressure (from 1 to 10 bar) and with simultaneous evaporation of water and formation of a prepolymer, prepolymer and vapor are then continuously separated, the vapor is rectified and the entrained diamines are recycled. Finally, the prepolymer is passed into a polycondensation zone and is subjected to polycondensation under superatmospheric pressure of from 1 to 10 bar and at from 280° to 330° C. during a residence time of 5–30 minutes. Of course, the temperature in the reactor is above that melting point of the resulting prepolymer which is required at the particular steam pressure.

As a result of these short residence times, the formation of triamines is substantially prevented.

The resulting polyamide prepolymer, which as a rule has a viscosity number of from 40 to 70, preferably from 40 to 60, ml/g, measured in a 0.5% strength by weight solution in 96% strength sulfuric acid at 25° C., is removed continuously from the condensation zone.

In a preferred procedure, the polyamide prepolymer thus obtained is passed in molten form through a discharge zone with simultaneous removal of the residual water present in the melt. Suitable discharge zones are, for example, devolatilization extruders. The melt thus freed from the water is then extruded and the extrudate is granulated.

In a particularly preferred embodiment, it is also possible to add the component B) and, if required, C) to F) to the prepolymer of component A) in the devolatilization extruder itself, in which case the devolatilization extruder is usually equipped with suitable mixing elements, such as kneading blocks. Thereafter, extrudation, cooling and granulation are likewise effected.

These granules are subjected to continuous or batchwise solid-phase condensation under inert gas at below the melting point, for example from 170° to 240° C., until the desired viscosity is reached. For example, tumbling driers can be used for the batchwise solid-phase condensation and heating tubes through which hot inert gas flows can be used for the continuous solid-phase condensation. The continuous solid-phase condensation is preferred, the inert gas used being nitrogen or in particular superheated steam, advantageously the steam obtained at the top of the column.

The viscosity number, measured in a 0.5% strength by weight solution in 96% strength sulfuric acid at 25° C., is in general from 100 to 500, preferably from 110 to 200, ml/g after the solid-phase condensation or the other abovementioned preparation processes.

The novel molding materials contain, as component B), from 5 to 95, preferably from 5 to 50, in particular from 5 to 30, % by weight of a copolymer of vinylaromatic compounds with $\alpha,\beta$-unsaturated dicarboxylic anhydrides and $\alpha,\beta$-unsaturated dicarboximides.

The component B) is preferably composed of:

$b_1$) from 10 to 90, preferably from 20 to 80, in particular from 30 to 70, % by weight of a vinylaromatic compound, $b_2$) from 1 to 50, preferably from 1 to 35, in particular from 1 to 25, % by weight of an $\alpha,\beta$-unsaturated dicarboxylic anhydride, $b_3$) from 9 to 80, preferably from 19 to 75, in particular from 29 to 70, % by weight of an $\alpha,\beta$-unsaturated dicarboximide, and $b_4$) from 0 to 35, preferably from 0 to 30, in particular from 0 to 25, % by weight of other monomers capable of free radical polymerization.

Examples of vinylaromatic compounds $b_1$) are chlorostyrene, o-methylstyrene, p-methylstyrene, dimethylstyrene, m-ethylstyrene, isopropylstyrene, tert-butylstyrene, $\alpha$-methylstyrene, and ethylvinyltoluene, styrene being particularly preferred.

Mixtures of the particular monomers $b_1$) to b4) can of course also be used.

Suitable monomers $b_2$) are as a rule of 4 to 20, preferably 4 to 12, carbon atoms. The monomers $b_2$) are preferably cyclic anhydrides, where the double bond may be either exocyclic or endocyclic.

Maleic anhydride, methyl maleic anhydride and itaconic anhydride are preferred.

Suitable dicarboximides $b_3$) are monomers of the formula I

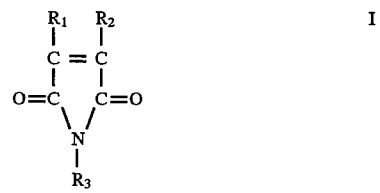

where $R_1$, $R_2$ and $R_3$, independently of one another, are each hydrogen or a saturated or mono-or polyunsaturated aliphatic radical, where these carbon atoms may furthermore be interrupted by isolated oxygen atoms, or are each a cycloaliphatic, an araliphatic or an aromatic radical.

The alkyl radical may be either linear or branched and is preferably of 1 to 20 carbon atoms. Examples are methyl, ethyl, propyl, butyl, n-hexyl, n-pentyl, n-decyl and n-dodecyl.

The cycloalkyl radical may be unsubstituted or substituted. Examples are cyclobutyl, cyclopentyl, cyclohexyl and p-methylcyclohexyl. The alkyl group of the aralkyl radicals may be either linear or branched and the aralkyl radicals may also have substituents (alkyl or halogen). Examples of aralkyl radicals and aromatic radicals are benzyl, ethylphenyl and p-chlorobenzyl. Preferred radicals are phenyl, naphthyl and cyclohexyl.

The copolymers may furthermore contain monomers $b_4$) which are derived from further compounds capable of free radical polymerization. Examples of these are (meth)acrylic acid, (meth)acrylic acid derivatives and (meth)acrylonitrile.

The copolymers contain the units $b_1$) to $b_3$) and, if required, $b_4$) in random distribution. As a rule, the copolymers B) have molecular weights ($M_w$) of from 30,000 to 500,000, preferably from 50,000 to 25,000, in particular from 70,000 to 200,000.

The copolymers are usually prepared by free radical polymerization. The reaction may be carried out by suspension, emulsion, solution or mass polymerization, the last mentioned method being preferred. Such preparation processes are known to a person skilled in the art, so that further details in this respect are unnecessary.

The copolymers can also be prepared, for example, as described in U.S. Pat. No. 4,404,322, by first subjecting the components $b_1$), $b_2$) and, if required, $b_4$) to free radical polymerization and then converting some of the anhydride groups present in the reaction product into imide groups with corresponding primary amines $H_2N-R_4$ and/or ammonia. The alkyl radicals $R_4$ of the primary amines correspond here to the radical $R_3$ as stated above for compounds of the formula I.

The reaction can be carried out in general either in solution in solvents such as benzene or toluene or in the absence of a solvent, the melt of the copolymer of $b_1$) and $b_2$) and, if required, $b_4$) being reacted with ammonia and/or primary amines in suitable apparatuses (such as extruders).

This reaction is carried out as a rule in the presence of a tertiary amine (eg. triethylamine or N,N-diethylaniline) as catalyst at from 80° to 350° C. In this preparation variant, the copolymers are prepared by free radical polymerization preferably from 50–75% by weight of aromatic vinyl compounds with 25–50 mol % of cyclic α,β-unsaturated dicarboxylic anhydrides and are then treated with ammonia and/or primary amines, the molar ratio of the components of $b_2$):$R_4$-$NH_2$ being from 1:5 to 5:1.

The novel molding materials contain, as polymer (C), from 0 to 90, preferably from 0 to 60, in particular from 0 to 40, % by weight of an ASA, ABS or SAN polymer or of a polymer of $C_1$–$C_{18}$-alkyl esters of (meth)acrylic acid or blends of such polymers.

The mixing ratio of the polymers can be varied within wide limits; where (meth)acrylates are mixed with ASA, ABS or SAN, however, it should be noted that these are miscible only up to an acrylonitrile content of 27% by weight (up to 250° C., based on the processing temperature) or up to 25% by weight (up to 300° C.), based on the total content of, for example, ABS.

Preferred ASA polymers are composed of a soft or rubber phase comprising a graft polymer of $C_1$ from 50 to 90% by weight of a grafting base based on
  $C_{11}$ from 95 to 99.5% by weight of a $C_2$–$C_{10}$-alkyl acrylate and
  $C_{12}$ from 0.1 to 5% by weight of a bifunctional monomer having two olefinic, nonconjugated double bonds and
$C_2$ from 10 to 50% by weight of a grafting base comprising
  $C_{21}$ from 20 to 50% by weight of styrene or substituted styrenes of the general formula I or of a mixture thereof and
  $C_{22}$ from 10 to 80% by weight of acrylonitrile, methacrylonitrile, acrylates or methacrylates or of a mixture thereof, as a blend with a hard matrix based on a SAN copolymers $C_3$) comprising
  $C_{31}$ from 50 to 90, preferably from 55 to 90, in particular from 65 to 85, % by weight of styrene and/or substituted styrenes of the general formula I and
  $C_{32}$ from 10 to 50, preferably from 10 to 45, in particular from 15 to 35, % by weight of acrylonitrile and/or methacrylonitrile.

The component $C_1$) is an elastomer which has a glass transition temperature of less than –20° C., in particular less than –30° C.

For the preparation of the elastomer, esters of acrylic acid of 2 to 10, in particular from 4 to 8, carbon atoms are used as main monomers for $C_{11}$). Particularly preferred monomers are tert-butyl, isobutyl, n-butyl acrylate and 2-ethylhexyl acrylate, among which the two last-mentioned are particularly preferred.

In addition to these esters of acrylic acid, from 0.1 to 5, in particular from 1 to 4, % by weight, based on the total weight $C_{11}$+$C_{12}$, of a polyfunctional monomer having at least two olefinic, nonconjugated double bonds are used. Among these, bifunctional compounds, ie. those having two nonconjugated double bonds, are preferably used. Examples of these are vinylbenzene, diallyl fumarate, diallyl phthalate, triallyl cyanurate, triallyl isocyanurate, tricyclodecenyl acrylate and dihydrodicyclopentadienyl acrylate, among which the last two are particularly preferred.

Processes for the preparation of the grafting base $C_1$ are known per se and are described, for example, in DE-B 1 260 135. Corresponding products are also commercially available.

The preparation by emulsion polymerization has proven to be particularly advantageous in some cases.

The exact polymerization conditions, in particular the type, dosage and amount of the emulsifier, are preferably chosen so that the latex of the acrylate, which is partly or completely crosslinked, has an average particle size (weight average $d_{50}$) of from about 200 to 700 nm, in particular from 250 to 600 nm. The latex preferably has a narrow particle size distribution, ie. the quotient $$Q = \frac{d_{90} - d_{10}}{d_{50}}$$

is preferably less than 0.5, in particular less than 0.35.

The amount of the grafting base $C_1$ in the graft polymer $C_1$+$C_2$ is from 50 to 90, preferably from 55 to 85, in particular from 60 to 80% by weight, based on the total weight of $C_1$+$C_2$.

A graft shell $C_2$ is grafted onto the grafting base $C_1$ and is obtainable by copolymerization of
  $C_{21}$ from 20 to 90, preferably from 30 to 90, in particular from 30 to 80, % by weight of styrene or substituted styrenes of the general formula I

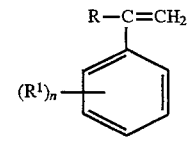

where R is alkyl of 1 to 8 carbon atoms, hydrogen or halogen, $R_1$ is alkyl of 1 to 8 carbon atoms or halogen and n is 0, 1, 2 or 3, and $C_{22}$ from 10 to 80, preferably from 10 to 70, in particular from 20 to 70, % by weight of acrylonitrile, methacrylonitrile, acrylates or methacrylates or of a mixture thereof.

Examples of substituted styrenes are α-methylstyrene, p-methylstyrene, p-chlorostyrene and p-chloro-α-methylstyrene, among which styrene and α-methylstyrene are preferred.

Preferred acrylates and methacrylates are those whose homopolymers and copolymers with the other monomers of the component $C_{22}$) have glass transition temperatures of more than 20° C.; in principle, however, other acrylates may also be used, preferably in amounts such that the resulting glass transition temperature $T_g$ for the component $C_2$ as a whole is above 20° C.

Esters of acrylic or methacrylic acid with $C_1$–$C_8$-alcohols and epoxy-containing esters, such as glycidyl acrylate or glycidyl methacrylate, are particularly preferred. Very particularly preferred examples are methyl methacrylate, tert-butyl methacrylate, glycidyl methacrylate and n-butyl acrylate, the last-mentioned one being used preferably in not too large an amount, owing to its property of forming polymers having a very low $T_g$.

The graft shell $C_2$) can be prepared in one process step or in a plurality of process steps, for example two or three, the overall composition being unaffected by this.

The graft shell is preferably prepared in emulsion, as described, for example, in German Patent 1,260,135 and German Laid-Open Applications DOS 3,227,555, DOS 3,149,357 and DOS 3,414, 118.

Depending on the conditions chosen, a certain amount of free copolymers of styrene or substituted styrene derivatives and (meth)acrylonitrile or (meth)acrylates is formed in the graft copolymerization.

The graft copolymer $C_1$+$C_2$ generally has an average particle size of from 100 to 1000, in particular from 200 to 700 nm ($d_{50}$ weight average). The conditions in the preparation of the elastomer $C_1$) and in the grafting are therefore preferably chosen so that particle sizes in this range result. The relevant measures are known and are described, for example, in German Patent 1,260,135, German Laid-Open Application DOS 2,826,925 and J. Appl. Polym. Sci. 9 (1965), 2929–2938. The increase in the particle size of the latex of the elastomer can be achieved, for example, by means of agglomeration.

For the purposes of this invention, the graft polymer ($C_1$+$C_2$) includes the free, ungrafted homo-and copolymers formed in the graft copolymerization for the preparation of the component $C_2$).

Some preferred graft polymers are stated below:
1: 60% by weight of grafting base $C_1$ comprising
  $C_{11}$ 98% by weight of n-butyl acrylate and
  $C_{12}$ 2% by weight of dihydrodicyclopentadienyl acrylate and
  40% by weight of graft shell $C_2$ comprising
  $C_{21}$ 75% by weight of styrene and
  $C_{22}$ 25% by weight of acrylonitrile
2: Grafting base as in 1 with 5% by weight of a first graft shell comprising styrene and
  35% by weight of a second graft stage comprising
  $C_{21}$ 75% by weight of styrene and
  $C_{22}$ 25% by weight of acrylonitrile
3: Grafting base as in 1 with 13% by weight of a first graft stage comprising styrene and 27% by weight of a second graft stage comprising styrene and acrylonitrile in a weight ratio of 3:1.

The products contained as component $C_3$) can be prepared, for example, by the process described in German Published Applications DAS 1,001,001 and DAS 1,003,436. Such copolymers are also commercially available. The weight average molecular weight determined by light scattering is preferably from 50,000 to 500,000, in particular from 100,000 to 250,000.

The weight ratio ($C_1$+$C_2$):$C_3$ is from 1:2.5 to 2.5:1, preferably from 1:2 to 2:1, in particular from 1:1.5 to 1.5:1.

Suitable SAN polymers as component C) are described above (cf. $C_{31}$ and $C_{32}$).

The viscosity number of the SAN polymers, measured according to DIN 53 727 as a 0.5% strength by weight solution in dimethyl-formamide at 23° C., is in general from 40 to 100, preferably from 50 to 80, ml/g.

ABS polymers as polymers (C) in the novel molding materials have the same structure as described above for ASA polymers. Instead of the acrylate rubber $C_1$) of the grafting base, conjugated dienes are usually used in the ASA polymer, so that the grafting base $C_4$ preferably has the following composition:
  $C_{41}$ from 70 to 100% by weight of a conjugated diene and
  $C_{42}$ from 0 to 30% by weight of a bifunctional monomer having two olefinic nonconjugated double bonds.

Examples of conjugated dienes are 1,3-pentadiene, alkyl-substituted dienes, such as 2,3-dimethylbutadiene, and conjugated hexadienes, heptadienes and octadienes and cyclic dienes, such as cyclopentadiene, butadiene and isoprene being preferred.

Graft $C_2$ and the hard matrix of the SAN copolymer $C_3$) remain unchanged in composition. Such products are commercially available. The preparation processes are known to a person skilled in the art, so that further information in this context is unnecessary.

The weight ratio ($C_4$+$C_2$):$C_3$ is from 3:1 to 1:3, preferably from 2:1 to 1:2.

A further suitable polymer (C) in the novel molding materials is a polymer of a $C_1$–$C_{18}$-alkyl ester of (meth) acrylic acid or a mixture of such a polymer.

According to the invention, the $C_1$–$C_{18}$-alkyl esters, such as methyl, ethyl, n-propyl, isopropyl, n-butyl, isobutyl, sec-butyl, tert-butyl, pentyl, hexyl, heptyl, octyl, 2-ethylhexyl, nonyl, decyl, lauryl or stearyl acrylate, preferably methyl acrylate, n-butyl acrylate and 2-ethylhexyl acrylate, and mixtures of these monomers are used as $C_1$–$C_{18}$-alkyl esters of acrylic acid.

According to the invention, the $C_1$–$C_{18}$-alkyl esters, such as methyl, ethyl, n-propyl, isopropyl, n-butyl, isobutyl, sec-butyl, tert-butyl, pentyl, hexyl, heptyl, octyl, 2-ethylhexyl, nonyl, decyl, lauryl or stearyl methacrylate, preferably methyl methacrylate, and mixtures of these monomers are used as $C_1$–$C_{18}$-alkyl esters of methacrylic acid.

Up to 50, preferably from 1 to 20, % by weight of the following monomers stated by way of example may be used as further comonomers:
  vinylaromatics, such as styrene, α-methylstyrene, vinyltoluene or p-tert-butylstyrene;
  p-aminostyrene;
  p-hydroxystyrene;
  p-vinylbenzoic acid;
  acrylic and methacrylic acid;
  acrylamide and methacrylamide;
  maleic acid and the imides and $C_1$–$C_{10}$-alkyl esters thereof;
  fumaric acid and the imides and $C_1$–$C_{10}$-alkyl esters thereof;
  itaconic acid and the imides and $C_1$–$C_{10}$-alkyl esters thereof;

acrylonitrile and methacrylonitrile;
hydroxyalkyl (meth)acrylates.

Polymers of 99% by weight of methyl methacrylate and 1% by weight of methyl acrylate, having a weight average molecular weight ($M_w$) of from 60,000 to 300,000, in particular from 80,000 to 150,000, g/mol have proven particularly advantageous.

Polymethyl methacrylate is prepared, as a rule, by known polymerization methods, such as mass, solution, emulsion or bead polymerization. Such processes are described, for example, in Kunststoffhandbuch, Vol. 9, Vieweg und Esser; Polymethylmethacrylat, Carl-Hanser-Verlag, Munich, 1975, pages 36 et seq.

The novel molding materials may contain from 0 to 20, preferably from 0 to 15, in particular from 0 to 10, % by weight of an elastomeric polymer which differs from B) and C). Such polymers are frequently also referred to as impact-modifying polymers, impact modifiers, elastomers or rubbers.

The component D) generally has at least one elastomer phase whose softening temperature is less than $-25°$ C., preferably less than $-30°$ C.

Rubbers which increase the toughness of polyamides generally have two essential features: they contain an elastomeric fraction which has a glass transition temperature of less than $-10°$ C., preferably less than $-30°$ C., and they contain at least one functional group which is capable of reacting with the polyamide. Suitable functional groups are, for example, carboxyl, carboxylic anhydride, carboxylic ester, carboxamido, carboximido, amino, hydroxyl, epoxy, urethane and oxazoline groups.

Examples of rubbers which increase the toughness of polyamides are the following:

EP and EPDM rubbers which have been grafted with the abovementioned functional groups. Suitable grafting reagents are, for example, maleic anhydride, itaconic acid, acrylic acid, glycidyl acrylate and glycidyl methacrylate. These monomers may be grafted in the melt or in solution, in the presence or absence of a free radical initiator, eg. cumol hydroperoxide, onto the polymer.

Copolymers of α-olefins may also be mentioned. The α-olefins are usually monomers of 2 to 8 carbon atoms, preferably ethylene and propylene. Alkyl acrylates or alkyl methacrylates which are derived from alcohols of 1 to 8 carbon atoms, preferably from ethanol, butanol or ethylhexanol, and reactive comonomers, such as acrylic acid, methacrylic acid, maleic acid, maleic anhydride or glycidyl (meth)acrylate, and furthermore vinyl esters, in particular vinyl acetate, have proven suitable as comonomers. Mixtures of different comonomers may also be used. Copolymers of ethylene with ethyl or butyl acrylate and acrylic acid and/or maleic anhydride have proven particularly useful.

The copolymers can be prepared in a high-pressure process at from 400 to 4500 bar or by grafting the comonomers onto the poly-α-olefins. The amount of the α-olefin in the copolymer is in general from 99.95 to 55% by weight.

A further group of suitable impact modifiers comprises thermoplastic polyester elastomers. Polyester elastomers are understood as meaning segmented copolyether esters which contain long-chain segments which are derived, as a rule, from poly(alkylene) ether glycols and short-chain segments which are derived from low molecular weight diols and dicarboxylic acids.

Such products are known per se and are described in the literature, for example in U.S. Pat. No. 3,651,015. Corresponding products are also commercially available under the names Hytrel® (Du Pont), Arnitel® (Akzo) and Pelprene®.

Mixtures of different rubbers can of course also be used.

The novel molding materials may contain, as a further component, from 0 to 50, preferably up to 35, % by weight of a fibrous or particulate filler (component (E)) or of a mixture thereof.

Preferred fibrous reinforcing materials are carbon fibers, potassium titanate whiskers, aramid fibers and particularly preferably glass fibers. When glass fibers are used, they may be treated with a size and an adhesion promoter in order to improve compatibility with the thermoplastic amide (A). In general, the glass fibers used have a diameter of from 6 to 20 μm.

These glass fibers can be incorporated both in the form of short glass fibers and in the form of rovings. In the finished injection molded article, the average length of the glass fibers is preferably from 0.08 to 0.5 mm.

Suitable particulate fillers are amorphous silica, magnesium carbonate (chalk), kaolin (in particular calcined kaolin), powdered quartz, mica, talc, feldspar and in particular calcium silicates, such as wollastonite.

Preferred combinations of fillers are, for example, 20% by weight of glass fibers with 15% by weight of wollastonite and 15% by weight of glass fibers with 15% by weight of wollastonite.

In addition to the essential components A) and B) and, if required, C), and/or D) and/or E), the novel molding materials may contain conventional additives and processing assistants F). The amount thereof is in general up to 30, preferably up to 15, % by weight, based on the total weight of the components (A) to (F).

Conventional additives are, for example, stabilizers and antioxidants, heat stabilizers and UV stabilizers, lubricants and mold release agents, dyes and pigments and plasticizers.

Pigments and dyes are generally present in amounts of up to 4, preferably from 0.5 to 3.5, in particular from 0.5 to 3, % by weight.

The pigments for coloring thermoplastics are generally known, cf. for example R. Gächter and H. Müller, Taschenbuch der Kunststoffadditive, Carl Hanser Verlag, 1983, pages 494 to 510. A first preferred group of pigments comprises white pigments, such as zinc oxide, zinc sulfide, lead white (2 $PbCO_3.Pb(OH)_2$), lithopone, antimony white and titanium dioxide. Of the two most commonly used crystal modifications (rutile and anatase types) of titanium dioxide, the rutile form is particularly used for imparting whiteness to the novel molding materials.

Black pigments which may be used according to the invention are iron oxide black ($Fe_3O_4$), spinel black ($Cu(Cr, Fe)_2O_4$), manganese black (mixture of manganese dioxide, silica and iron oxide), cobalt black and antimony black and particularly preferably carbon black, which is generally used in the form of furnace black or gas black (cf. G. Benzing, Pigmente für Anstrichmittel, Expert-Verlag (1988), page 78 et seq.).

Of course, inorganic colored pigments, such as chromium oxide green, or organic colored pigments, such as azo pigments and phthalocyanines, can be used according to the invention for obtaining certain hues. Such pigments are in general commercially available.

It may also be advantageous to use the stated pigments or dyes as a mixture, for example carbon black with copper phthalocyanines, since the color dispersion in thermoplastics is generally facilitated.

Antioxidants and heat stabilizers which may be added to the thermoplastic materials according to the invention are, for example, halides of metals of Group I of the Periodic Table, for example sodium halides, potassium halides and lithium halides, if necessary in combination with copper(I) halides, for example chlorides, bromides or iodides. The halides, in particular those of copper, may also contain electron-rich π-ligands. Examples of such copper complexes are copper halide complexes with, for example, triphenylphosphine. Zinc fluoride and zinc chloride may also be used. Furthermore, sterically hindered phenols, hydroquinones, substituted members of this group, secondary aromatic amines, if necessary in combination with phosphorus-containing acids or salts thereof, and mixtures of these compounds, may be used, preferably in concentrations of up to 1% by weight, based on the weight of the mixture.

Examples of UV stabilizers are various substituted resorcinols, salicylates, benzotriazoles and benzophenones, which are used in general in amounts of up to 2% by weight.

Lubricants and mold release agents, which are added to the thermoplastic material as a rule in amounts of up to 1% by weight, are stearic acid, stearyl alcohol, alkyl stearates and stearamides and esters of pentaerythritol with longchain fatty acids. Salts of calcium, of zinc or aluminum with stearic acid and dialkyl ketones, eg. distearyl ketone, may also be used.

The additives also include stabilizers which prevent the decomposition of red phosphorus in the presence of moisture and atmospheric oxygen. Examples are compounds of cadmium, of zinc, of aluminum, of tin, of magnesium, of manganese and of titanium. Particularly suitable compounds are, for example, oxides of the stated metals, and carbonates or basic carbonates, hydroxides and salts of organic or inorganic acids, such as acetates or phosphates or hydrogen phosphates.

Only red phosphorus and the other flameproofing agents known per se for polypaides are mentioned here as flameproofing agents.

The novel thermoplastic molding materials may be prepared by processes known per se, by mixing the starting components in a conventional mixing apparatus, such as a screw extruder, a Brabender mill or a Banbury mill, and then carrying out extrusion. After extrusion, the extrudate is cooled and comminuted.

The novel molding materials have good mechanical properties in combination with good shrinkage. In particular, they can be readily processed by thermoplastic methods and accordingly are suitable for the production of fibers, films and moldings.

EXAMPLES

Component A)

An aqueous solution of about 60% strength and consisting of terephthalic acid (32.2 mol % 37.5% by weight), isophthalic acid (17.8 mol % 20.6% by weight), hexamethylenediamine (48.1 mol % 39.1% by weight or 1.9 mol % 2.8% by weight), bis(4-aminocyclohexyl)methane and 0.174 kg of propionic acid and 100 kg of water was conveyed from a heated storage container at about 80° C. at a rate corresponding to 5 kg/hour of polyamide by means of a metering pump into a tubular evaporator arranged partly horizontally and partly vertically. The evaporator was heated with a liquid heating medium which was at 326° C., with vigorous circulation. The evaporator had a length of 3 m, a capacity of 180 ml and a heat-transfer surface area of about 1300 cm². The residence time in the evaporator was 50 seconds. The prepolymer/steam mixture emerging from the evaporator was at 310° C. and was separated into steam and melt in a separator. The melt remained in the separator for a further 10 minutes and was then discharged by means of a discharge screw having a devolatilization zone in the form of extruders, solidified in a water bath and then granulated. The separator and the evaporator zone were kept at 5 bar by a pressure regulation means which was arranged downstream of the column. The steam separated off in the separator was fed to a packed column which had about 10 theoretical plates and to the top of which about 1 l/h of vapor condensate was added to generate a reflux. The resulting temperature at the top of the column was 152° C. The steam emerging after the relief valve was condensed and contained less than 0.05% by weight of hexamethylenediamine. An aqueous solution of hexamethylenediamine which contained 80% by weight of hexamethylenediamine, based in each case on polyamide produced, was obtained as the bottom product of the column. This solution was added to the starting salt solution again by means of a pump, before the entry into the evaporator.

After emergence of the polymer melt from the separator, the polyamide had a very pale natural color and a viscosity number of 48 ml/g (measured as a 0.5% strength solution at 25° C. in 96% strength by weight $H_2SO_4$ according to DIN 53 246).

The product had roughly equivalent numbers of terminal carboxyl and amino groups.

In the discharge extruder, the melt was let down to atmospheric pressure and underwent virtually no further condensation during a residence time of less than 1 minute.

The product was then heated batchwise at 200° C. in the solid phase in a stationary heating tube (double-wall glass tube which was heated from the outside with oil to the treatment temperature and had an internal diameter of 120 mm and a length of 1000 mm and through which 120 l/min of superheated steam flowed) until the viscosity number reached 112 ml/g. The residence time was 23 hours. In the course of this heating, if necessary a major part of the extractable residual monomers was also extracted from the steam.

Composition:

$a_1$) 32.2 mol % or 37.5% by weight $a_2$) 17.8 mol % or 20.6% by weight $a_3$) 48.1 mol % or 39.1% by weight $a_4$) 1.9 mol % or 2.8% by weight The specific heat of fusion $\Delta H_{cryst}$ was determined by means of Differential Scanning Calorimetry (DSC 990 from Du Pont) at 20° C./min as a relative measure of the crystallinity: 54 J/g.

Component A/1V

Poly-ε-caprolactam viscosity number: 150 ml/g $\Delta H_{cryst}$: 75 J/g (Ultramid® B3 from BASF AG)

Component B/1

A copolymer of:

46.1% by weight of styrene 2.3% by weight of maleic anhydride 51.6% by weight of N-phenylmaleimide $M_w$=135,000 (Malecca® IP MS-NA from Showa Denka)

Component B/2

A copolymer of:

47.5% by weight of styrene 6.2% by weight of maleic anhydride 46.3% by weight of N-phenylmaleimide $M_w$=135,000 (Malecca® MS-L2A from Showa Denka)

13

Component C/1

An ABS polymer (Terluran® 967 K from BASF AG), obtainable according to Example 1 of DE-A 24 27 960:

The following products were initially taken in a V2A stainless steel kettle designed for 10 atm (gauge pressure) and having a paddle stirrer:

150 parts of water, 1.2 parts of the sodium salt of a paraffin sulfonic acid ($C_{12}$–$C_{18}$), 0.3 part of potassium persulfate, 0.3 part of sodium bicarbonate, 0.15 part of sodium pyrophosphate.

In order to remove the oxygen, the kettle was flushed twice with nitrogen and the solution was then heated to 65° C. in a nitrogen atmosphere. 0.5 part of tert-dodecyl mercaptan and 16.6 parts of butadiene were then added to the solution. One hour after the beginning of the polymerization, a further 83.3 parts of butadiene were metered in over 5 hours. 5 hours after the end of the butadiene addition, ie. after a total of 11 hours, a further 0.5 part of tert-dodecyl mercaptan was added. After the total reaction time of 19 hours, a polybutadiene emulsion having a solids content of 39.2%, based on the emulsion, was obtained at a conversion of 96%. The polybutadiene latex had a glass transition temperature of about −80° C. The particle size distribution (integral mass distribution) determined by means of an ultracentrifuge is characterized by the following values:

$d_{10}$ value 0.06 μm $d_{50}$ value 0.08 μm $d_{90}$ value 0.105 μm 255 parts of the polybutadiene emulsion were diluted with 74 parts of water at 65° C. For agglomeration of the latex, 30 parts of an aqueous emulsion of an ethyl acrylate copolymer which contained 96% by weight of ethyl acrylate and 4% by weight of methyl acrylamide as polymerized units were metered in. The solids content of this emulsion was 10% by weight, based on the emulsion. After the agglomeration, a polybutadiene latex in which about 80% of the particles were in the nonagglomerated state was obtained. The particle size distribution (integral mass distribution) of the agglomerated polybutadiene latex, measured using the ultracentrifuge, is characterized by the following values:

$d_{10}$ value 0.079 μm $d_{50}$ value 0.238 μm $d_{90}$ value 0.323 μm

The polybutadiene emulsion thus obtained was heated to 70° C., and 0.13 part of potassium persulfate (in the form of a 3% strength aqueous solution), 0.02 part of tert-dodecyl mercaptan and 11 parts of a mixture of styrene and acrylonitrile were added at this temperature. The weight ratio of styrene to acrylonitrile in this mixture was 7:3. 10 minutes after the beginning of the grafting reaction, a mixture of a further 39 parts of styrene, 17 parts of acrylonitrile and 0.1 part of tert-dodecyl mercaptan was metered in over 2¾ hours. The resulting reaction temperature was 75° C. After the end of the monomer addition, the reaction was continued for a further hour and the resulting graft polymer was then precipitated by means of a calcium chloride solution at 95° C. and was filtered off with suction. The moist crumbs of the grafted polybutadiene were incorporated by means of an extruder into the melt of a styrene/acrylonitrile copolymer which contained 65% by weight of styrene and 35% by weight of acrylonitrile as polymerized units. The grafted polybutadiene was mixed with the styrene/acrylonitrile copolymer in a weight ratio of 3:7.

Component D

An ethylene/n-butyl acrylate/acrylic acid/maleic anhydride copolymer having the composition: 60:35:4.8:0.2% by weight.

Preparation of the molding materials

The amounts of the particular components stated in the table were compounded in a twin-extruder (ZSK 30 from Werner & Pfleiderer) at 325° C. in a conventional manner. The polymer melt was devolatilized and extruded, and the extrudate was passed through a waterbath, granulated and dried. The granules were then processed at 325° C. to give injection molded panels.

The free shrinkage of these injection molded panels (110×110×2 mm)—central sprue was determined. The percentage value is obtained from the percentage difference between the area of the shaped article one hour after the injection molding process and the area of the injection mold.

The compositions of the molding materials and the results of the measurements are shown in the table.

TABLE

| Example | Component A [% by weight] | Component B [% by weight] | Component C [% by weight] | Component D [% by weight] | Shrinkage [%] |
| --- | --- | --- | --- | --- | --- |
| 1 | A/1 100 | — | — | — | 1.8 |
| 2 | A/1 80 | B/1 20 | — | — | 1.0 |
| 3 | A/1 60 | B/1 5 | C/1 35 | — | 0.6 |
| 4 | A/1 60 | B/2 2 | C/1 38 | — | 0.7 |
| 5 | A/1 60 | B/2 5 | C/1 30 | D 5 | 0.6 |
| 1* | A/1 V 100 | — | — | — | 1.5 |
| 2* | A/1 V 80 | B/1 20 | — | — | 1.3 |
| 3* | A/1 V 50 | B/1 5 | C/1 35 | — | 1.2 |
| 4* | A/1 V 60 | B/2 2 | C/1 38 | — | 1.2 |
| 5* | A/1 V 60 | B/2 5 | C/1 30 | D 5 | 1.3 |

*) for comparison

We claim:

1. A thermoplastic molding material containing:
A) from 5 to 95% by weight of a semicrystalline, partly aromatic copolyamide composed of $a_1$) from 30 to 44 mol % of units which are derived from terephthalic acid, $a_2$) from 6 to 20 mol % of units which are derived from isophthalic acid, $a_3$) from 43 to 49.5 mol % of units which are derived from hexamethylenediamine and $a_4$) from 0.5 to 7 mol % of units which are derived from aliphatic cyclic diamines of 6 to 30 carbon atoms, the molar percentages of the components $a_1$) to $a_4$) summing to 100%, B) from 5 to 95% by weight of a copolymer of vinylaromatic compounds with α,β-unsaturated dicarboxylic anhydrides and α,β-unsaturated dicarboximides, C) from 0 to 90% by weight of an SAN, ABS or ASA polymer or of a polymer of a $C_1$–$C_{18}$-alkyl ester of (meth)acrylic acid or of a mixture thereof, D) from 0 to 20% by weight of an elastomeric polymer, E) from 0 to 50% by weight of a fibrous or particulate filler and F) from 0 to 30% by weight of conventional additives and processing assistants, the percentages by weight of the components A) to F) summing to 100%.

2. A thermoplastic molding material as claimed in claim 1, in which the copolyamide A) is composed of from 32 to 40 mol % of $a_1$)

from 10 to 18 mol % of $a_2$)

from 46 to 48.5 mol % of $a_3$) and from 1.5 to 4 mol % of $a_4$).

3. A thermoplastic molding material as claimed in claim 1, in which the copolyamide A) may contain up to 4% by weight, based on 100% by weight of A), of further polyamide-forming monomers $a_5$).

4. A thermoplastic molding material as claimed in claim 1, in which the aliphatic cyclic diamine $a_4$) is composed of bis (4-aminocyclohexyl) methane or bis (4-amino-3-methylcyclohexyl) methane or of a mixture thereof.

5. A thermoplastic molding material as claimed in claim 1, in which the copolyamide A) has a triamine content of less than 0.5% by weight.

6. A thermoplastic molding material as claimed in claim 1, in which the copolyamide A) has a crystallinity greater than 30%.

7. A thermoplastic molding material as claimed in claim 1, in which the component B) is composed of $b_1$) from 10 to 90% by weight of a vinylaromatic compound $b_2$) from 1 to 50% by weight of an $\alpha,\beta$-unsaturated dicarboxylic anhydride $b_3$) from 9 to 80% by weight of an $\alpha,\beta$-unsaturated dicarboximide, and $b_4$) from 0 to 35% by weight of other monomers capable of free radical polymerization.

8. A thermoplastic molding material as claimed in claim 1, in which the copolymer B) is obtainable by free radical polymerization of the components $b_1$) to $b_3$) and, if required, $b_4$).

9. A thermoplastic molding material as claimed in claim 1, in which the copolymer B) is obtainable by free radical polymerization of the components $b_1$) and $b_2$) and, if required, $b_4$) and subsequent reaction with primary amines or ammonia.

10. A molding obtainable from a thermoplastic molding material as claimed in claim 1.

* * * * *